(12) United States Patent
Socha et al.

(10) Patent No.: US 9,982,600 B2
(45) Date of Patent: May 29, 2018

(54) PRE-SKEWED CAPTURE PLATE

(71) Applicant: United Technologies Corporation, Hartford, CT (US)

(72) Inventors: Pawel Socha, Manchester, CT (US); Usman Khan, Manchester, CT (US); Richard Joseph Bulkovitch, Jr., Amston, CT (US); Michael Luther Comeau, Glastonbury, CT (US); Jonathan C. Reuben, West Hartford, CT (US); Kelsey Honious, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 415 days.

(21) Appl. No.: 14/715,876

(22) Filed: May 19, 2015

(65) Prior Publication Data
US 2016/0341123 A1  Nov. 24, 2016

(51) Int. Cl.
*F02C 7/06* (2006.01)
*F01D 9/06* (2006.01)
*F02C 3/06* (2006.01)
*F02C 7/20* (2006.01)

(52) U.S. Cl.
CPC ................ *F02C 7/06* (2013.01); *F01D 9/065* (2013.01); *F02C 3/06* (2013.01); *F02C 7/20* (2013.01); *F05D 2220/32* (2013.01); *F05D 2230/60* (2013.01); *Y02T 50/672* (2013.01)

(58) Field of Classification Search
CPC ...... F02C 7/06; F02C 3/06; F02C 7/20; F01D 9/065; F05D 2220/32; F05D 2230/60; Y02T 50/672
See application file for complete search history.

(56) References Cited

U.S. PATENT DOCUMENTS

| 2,919,888 A | | 1/1960 | Simmons | |
|---|---|---|---|---|
| 4,972,671 A | * | 11/1990 | Asselin | .................. F01D 9/065 184/6.11 |
| 4,979,872 A | | 12/1990 | Myers et al. | |
| 5,076,049 A | * | 12/1991 | Von Benken | .......... F01D 25/24 415/138 |
| 5,483,792 A | * | 1/1996 | Czachor | ............... F01D 25/162 60/796 |

(Continued)

FOREIGN PATENT DOCUMENTS

| EP | 1359364 | 11/2003 |
|---|---|---|
| WO | 2015026600 | 2/2015 |

OTHER PUBLICATIONS

European Search Report for Application No. 16170483.8 dated Aug. 31, 2016.

*Primary Examiner* — Richard Edgar
(74) *Attorney, Agent, or Firm* — Carlson, Gaskey & Olds, P.C.

(57) ABSTRACT

A coupling arrangement for a gas turbine engine according to an exemplary aspect of the present disclosure includes, among other things, a conduit between a first frame case defining a frame axis and a second frame case. A flange is coupled to the conduit defining a first axis and abuts the first frame case. A capture plate coupled to the conduit defines a second axis and abuts the second frame case. The first axis is offset relative to the second axis in an axial direction relative to the frame axis.

23 Claims, 5 Drawing Sheets

(56) References Cited

U.S. PATENT DOCUMENTS

| | | |
|---|---|---|
| 7,278,516 B2 | 10/2007 | Zalewski et al. |
| 7,762,087 B2 | 7/2010 | Somanath et al. |
| 8,061,969 B2 | 11/2011 | Durocher et al. |
| 2010/0135786 A1 | 6/2010 | Manteiga et al. |
| 2010/0275572 A1 | 11/2010 | Durocher et al. |
| 2013/0067930 A1 | 3/2013 | Paradis |
| 2015/0345337 A1* | 12/2015 | Petty ........................ F01D 25/28 415/126 |

* cited by examiner

PRE-SKEWED CAPTURE PLATE

BACKGROUND

This disclosure relates to coupling a component of a gas turbine engine, and more particularly to a coupling arrangement for a turbine frame.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Some turbine engines include a mid-turbine frame configured to transfer loads between a bearing compartment and other portions of the engine static structure. The mid-turbine frame may include one or more service lines for communicating fluid with the bearing compartment.

SUMMARY

A coupling arrangement for a gas turbine engine according to an example of the present disclosure includes a conduit between a first frame case defining a frame axis and a second frame case. A flange is coupled to the conduit defining a first axis and abuts the first frame case. A capture plate coupled to the conduit defines a second axis and abuts the second frame case. The first axis is offset relative to the second axis in an axial direction relative to the frame axis.

In a further embodiment of any of the forgoing embodiments, the first axis is offset relative to the second axis by a predetermined distance in the axial direction.

In a further embodiment of any of the forgoing embodiments, the first axis is offset relative to the second axis in a circumferential direction relative to the frame axis.

In a further embodiment of any of the forgoing embodiments, the flange defines a bore extending along the first axis and coupled to the conduit. The first axis is located at a first axial position, and the second axis is located at a second, different axial position relative to the frame axis.

In a further embodiment of any of the forgoing embodiments, the conduit is fixedly attached to the flange and is pivotably coupled to the capture plate.

In a further embodiment of any of the forgoing embodiments, the capture plate has a bore extending along the second axis, and the conduit includes a fitting configured to pivotably engage surfaces of the bore.

In a further embodiment of any of the forgoing embodiments, the capture plate includes a main body defining the bore, a collar portion extending from the main body and configured to abut the second frame case when in an installed position, and an interference member configured to selectively engage the second frame case such that the collar portion is spaced apart from the second frame case.

In a further embodiment of any of the forgoing embodiments, the main body is at least partially received in the second frame case when the interference member is spaced apart from the second frame case.

In a further embodiment of any of the forgoing embodiments, the collar portion defines an aperture configured to receive a fastener, and the aperture is positioned relative to the second axis such that the first axis is offset relative to the second axis by a predetermined distance.

In a further embodiment of any of the forgoing embodiments, the conduit is configured to communicate fluid with a bearing compartment.

A gas turbine engine according to an example of the present disclosure includes a mid-turbine frame between a first turbine and a second turbine. The mid-turbine frame includes a plurality of conduits extending between a first frame case and a second frame case, a plurality of flanges each defining a first axis and connecting one of the plurality of conduits to the first frame case, and a plurality of capture plates each defining a second axis and connecting one of the plurality of conduits to the second frame case such that each of the second axes is offset relative to a corresponding one of the first axes.

In a further embodiment of any of the forgoing embodiments, at least one of the plurality of conduits is configured to communicate fluid with a bearing compartment.

In a further embodiment of any of the forgoing embodiments, the first frame case is an inner frame case, and the second frame case is an outer frame case surrounding at least a portion of the first frame case.

In a further embodiment of any of the forgoing embodiments, the second frame case is an inner frame case, and the first frame case is an outer frame case surrounding at least a portion of the second frame case.

A method of designing a gas turbine engine according to an example of the present disclosure includes a) coupling a conduit to a first frame case at a first axial position; and b) coupling the conduit to a second frame case at a second axial position such that the conduit is loaded in a first direction.

A further embodiment of any of the foregoing embodiments includes applying a load to the first frame case in a second, different direction to reduce a distance between the first axial position and the second axial position.

In a further embodiment of any of the forgoing embodiments, the load in the first direction is less than or equal to the load in the second direction.

In a further embodiment of any of the forgoing embodiments, step b) includes determining the second axial position based upon thermal growth of the first frame case relative to the second frame case when in a first operating condition.

A further embodiment of any of the foregoing embodiments includes pivotably coupling the conduit to the second frame case.

In a further embodiment of any of the forgoing embodiments, the conduit is configured to communicate fluid with a bearing compartment.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
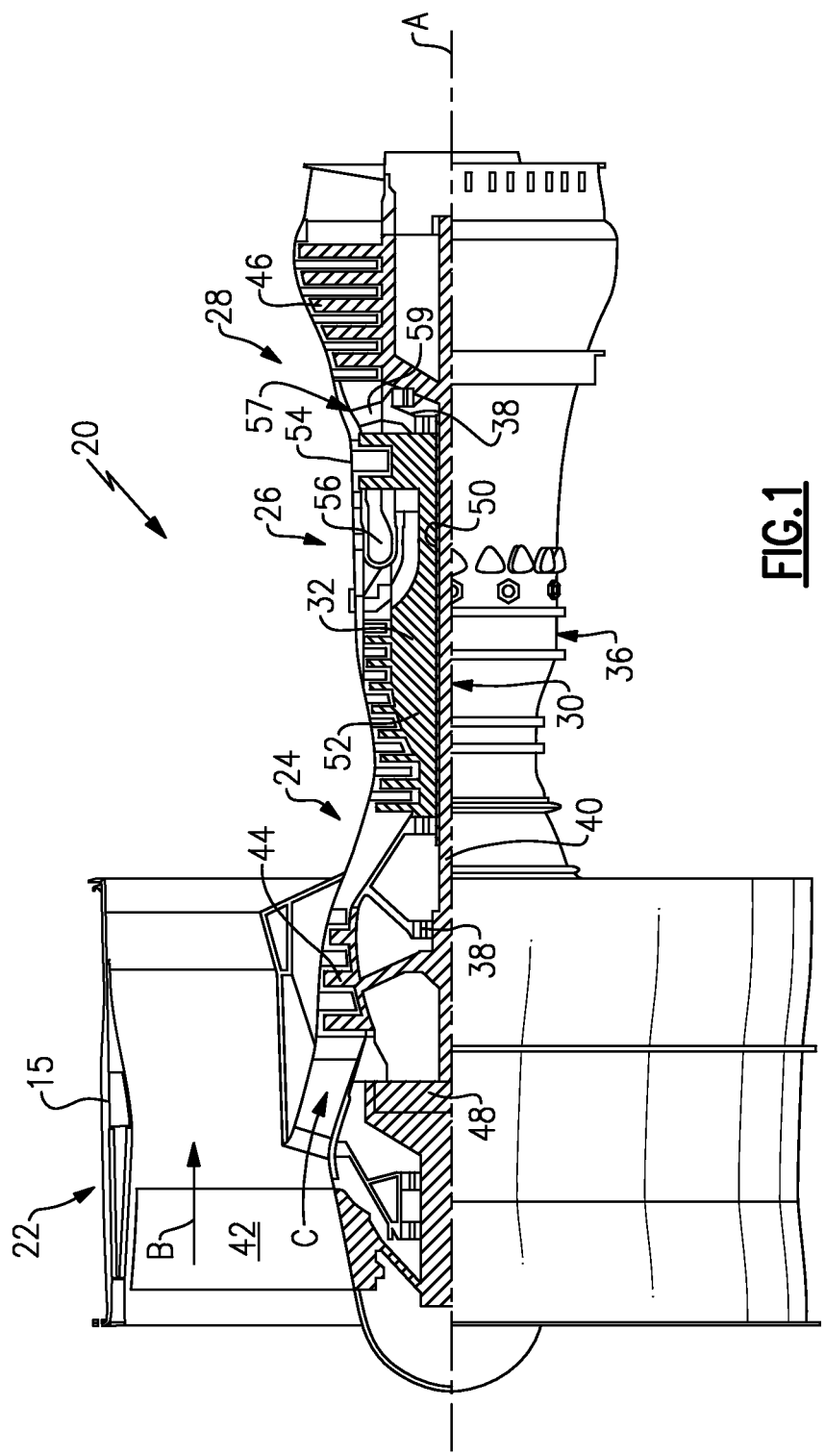
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
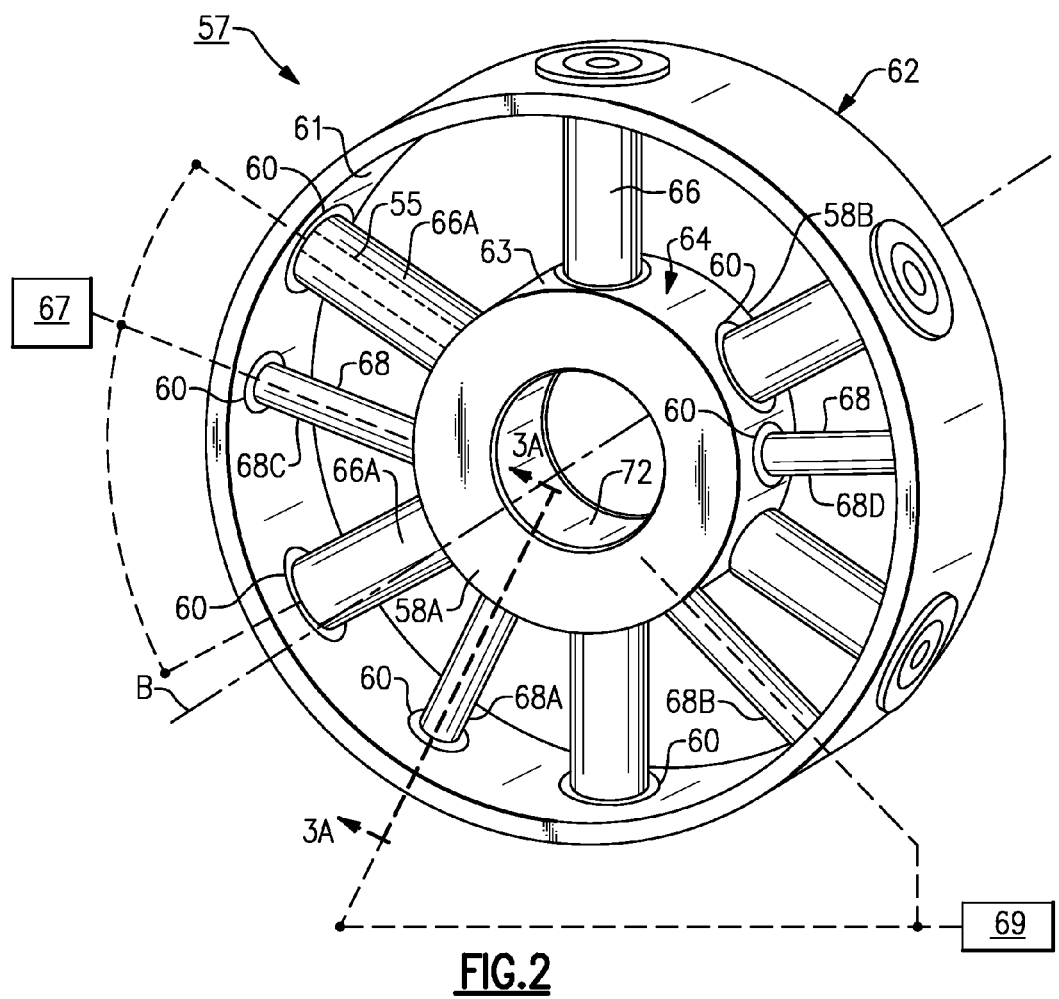
FIG. 2 schematically shows a perspective view of an embodiment of a mid-turbine frame.

FIG. 2 is a schematic perspective view of the mid-turbine frame 57. The mid-turbine frame 57 includes an outer frame case 62 and an inner frame case 64 coaxially arranged about a frame axis B. The frame axis B can be aligned with the engine axis A (shown in FIGS. 1 and 3A). The mid-turbine frame 57 is arranged axially between the low pressure turbine 46 (or first turbine) and the high pressure turbine 54 (or second turbine) shown in FIG. 1. The inner frame case 64 extends axially between a forwardmost portion 58A and an aftmost portion 58B. One or more spokes or tie rods 66 are distributed around a circumference of the inner frame case 64 and extend radially between an inner diameter 61 of the outer frame case 62 and an outer diameter 63 of the inner frame case 64 to provide structural support between the outer and inner frame cases 62, 64. For the purposes of this disclosure, the axial and radial directions are in relation to the frame axis B unless stated otherwise.

The inner frame case 64 supports the rotor assembly via the bearing system 38 (shown in FIG. 1), and distributes forces from the inner frame case 64 to the outer frame case 62 via the spokes 66. The outer frame case 62 is configured to transfer loads from the inner frame case 64 to other portions of the engine static structure 36 (shown in FIG. 1).

In some examples, one or more spokes $66_A$ define cooling passage(s) 55 (shown schematically in dashed line) to communicate cooling airflow from a coolant source 67 to the bearing system 38 or to a rotor assembly of the turbine section 28. Coolant sources 67 can include bleed air from an upstream stage of the compressor section 24, bypass air, or a secondary cooling system aboard the aircraft, for example.

One or more service lines 68 are distributed around the circumference of the inner frame case 64 to provide a path between the outer and inner frame cases 62, 64. In the illustrated example, the service lines 68 are positioned between adjacent pairs of spokes 66. The service lines 68 can include, but are not limited to, a conduit, a pressurized lubrication or oil supply line $68_A$, a lubrication or oil scavenge line $68_B$, a coolant supply line $68_C$ coupled to the coolant source 67, and a secondary lubrication or oil drain line $68_D$, for example.

The lubrication supply and scavenge lines $68_A$, $68_B$ are configured to communicate lubricant between the bearing system 38 and a lubrication source 69, which can include a reservoir and lubrication pump, for example, such that the bearing system 38 is lubricated and cooled during operation of the engine 20. Although six spokes 66 and four service lines 68 are shown in FIG. 2, the particular number of spokes 66 and service lines 68 can be determined based on the needs of a particular situation in view of the teachings herein. In the illustrated example, each of the spokes 66 and service lines 68 extends within a respective airfoil or static vane 59 arranged in the core flow path C (FIGS. 1 and 3A).

During operation of the engine 20, thermal growth of the outer frame case 62 due to relatively high temperatures of the engine 20 may cause the outer frame case 62 to move relative to the inner frame case 64. For example, the inner frame case 64 can move in a direction forward along the engine axis A relative to the outer frame case 62. The relative movement of the outer and inner frame cases 62, 64 may cause the service line(s) 68 to deflect or load in the axial and/or circumferential direction, such as in a forward direction relative to the frame axis B, which may result in lower service life of the service line 68 due to the relatively high stresses caused by the thermal deflection of the outer frame case 62 relative to the inner frame case 64.

Figure 3A:
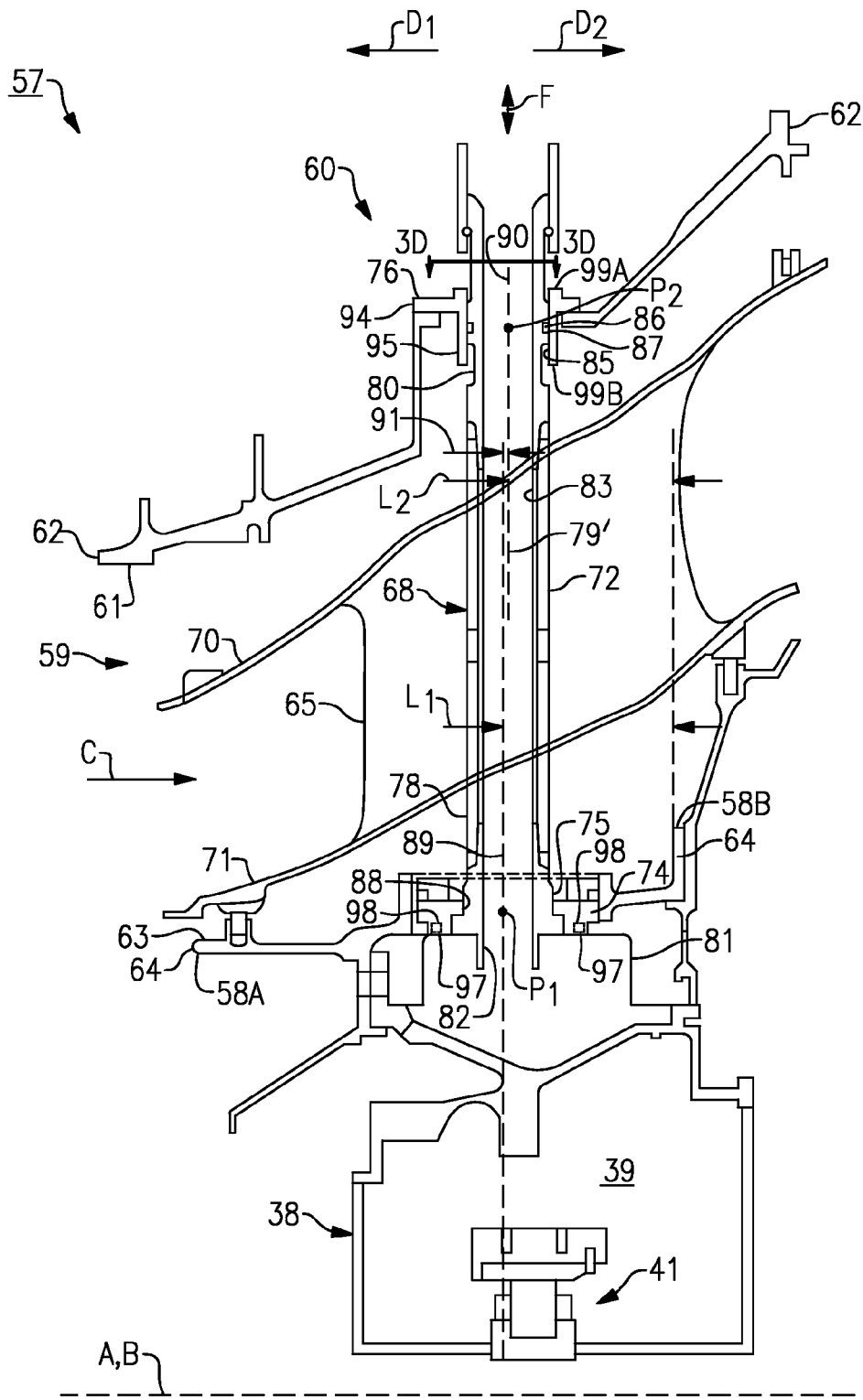
FIG. 3A illustrates a cross-sectional view of the mid-turbine frame taken along line 3A-3A of FIG. 2.
Figure 3B:
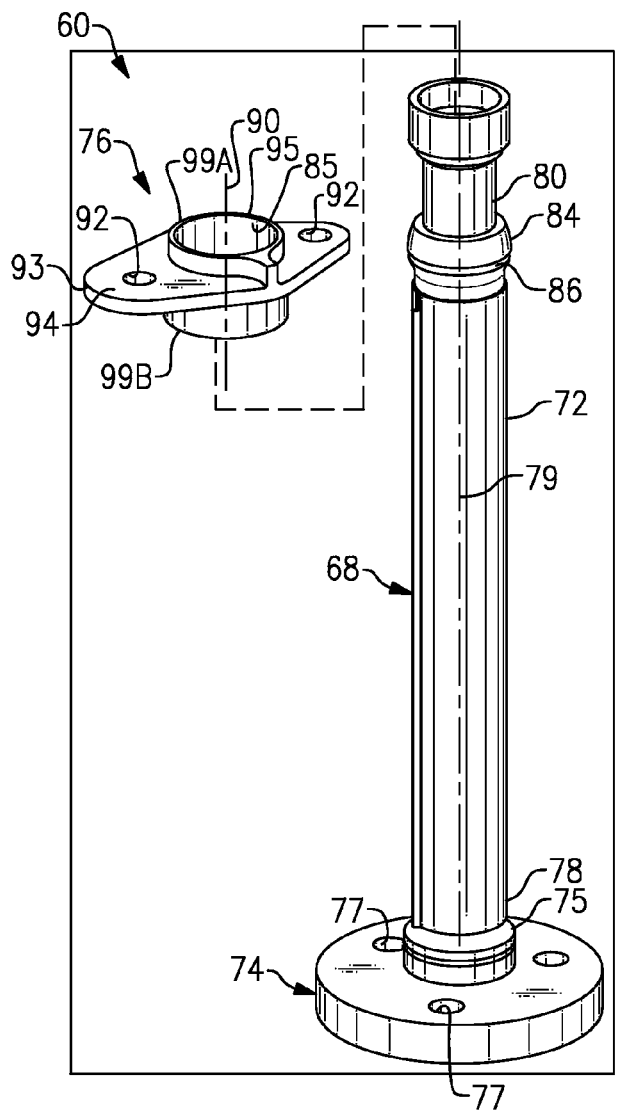
FIG. 3B illustrates an exploded view of the capture plate and service line of FIG. 3A.
Figure 3C:
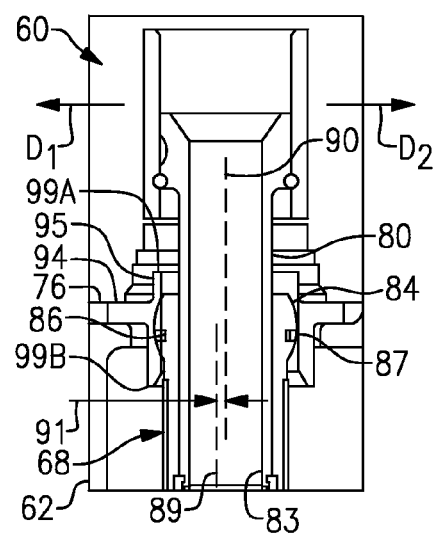
FIG. 3C illustrates a cross-sectional view of selected portions of the mid-turbine frame of FIG. 3A.
Figure 3D:
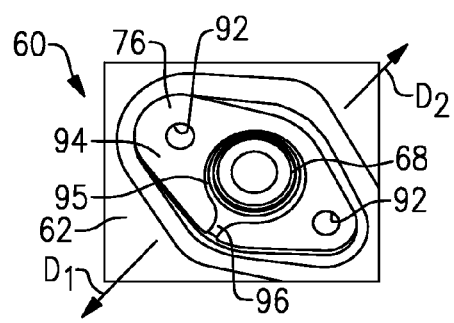
FIG. 3D illustrates a top-view of selected portions of the mid-turbine frame taken along line 3D-3D of FIG. 3A.

FIG. 3A is a schematic cross-sectional view of the mid-turbine frame 57 of FIG. 2, including a coupling arrangement 60 having at least one pre-skewed service line 68. FIGS. 3B to 3D show selected portions of the mid-turbine frame 57 and coupling arrangement 60 of FIG. 3A. Although the coupling arrangement 60 is shown with service line 68, it should be understood that any of the spokes 66 (FIG. 2) can be provided with the coupling arrangement 60. Other fluid arrangements and portions of the engine 20 can also benefit from the teachings herein, including conduits coupled to portions of the compressor section 24 or turbine section 28 such as the low pressure turbine 46, the high pressure turbine 54, or an intermediate turbine for a three-spool engine, or adjacent structures.

In the illustrated example, the service line 68 extends in a radial direction between an outer frame case 62 and an inner frame case 64 such that portions of the service line 68 extend through an airfoil 59. The service line 68 includes a proximal (or first) portion 78 coupled to the inner frame case 64 and a distal (or second) portion 80 coupled to the outer frame case 62. The airfoil 59 includes an airfoil section 65 extending between an outer platform 70 and an inner platform 71. The outer and inner platforms 70, 71 bound or otherwise define a portion of the core flow path C at the mid-turbine frame 57. An insulated sheath 72 can be arranged about portions of the service line 68 to reduce exposure of radiation or heat emitted from the core flow path C via the airfoil 59.

The coupling arrangement 60 is configured such that portions of the service line 68 are pre-skewed or pre-loaded in a direction opposite to a deflection of the outer frame case 62 relative to the inner frame case 64 during operation of the engine 20. Deflection of the outer frame case 62 relative to the inner frame case 64 can be estimated, observed or otherwise determined for a particular operating condition, such as take-off or cruise, for example. A location of the distal portion 80 of the service line 68 can be caused to move rearward from a first position to a second position relative to the inner frame case 64 or frame axis B such that the distal portion 80 of the service line 68 is pre-loaded in a desired direction and at a desired distance. Pre-loading the distal portion 80 relative to the proximal portion 78 causes the service line 68 to bend or otherwise flex when in an installed position. Various techniques for pre-skewing the service line 68 can be utilized, including any of the techniques described herein.

The coupling arrangement 60 includes a flange 74 and a capture plate 76 configured to couple the service line 68 to the mid-turbine frame 57 or adjacent structure. In the illustrated example, the proximal portion 78 of the service line 68 is coupled to the flange 74, and the distal portion 80 of the service line 68 is coupled to the capture plate 76. The flange 74 abuts or is fixedly attached to a bearing support 81, and the capture plate 76 abuts or is fixedly attached to the outer frame case 62. The capture plate 76 includes a collar portion 94 extending from a main body 95 in the shape of a circumferential ring or annulus defining the plate bore 85.

The collar portion 94 has a generally planar geometry and is spaced from at least one of ends 99A, 99B of the main body 95. The main body 95 is at least partially received in the outer frame case 62 when the collar portion 94 is located in an installed position. In alternative examples, the flange 74 is coupled to the outer frame case 62 or adjacent structure, and the capture plate 76 is coupled to the bearing support 81, the inner frame case 64, or adjacent structure.

The flange 74 and the capture plate 76 can be coupled to the outer and inner frame cases 62, 64 or adjacent structures utilizing various techniques. In the illustrated example, the flange 74 includes one or more apertures 77 (FIG. 3B) and the capture plate 76 includes one or more apertures 92 (FIGS. 3C and 3D) for receiving one or more bolts or mating portions to accept corresponding bolts. Other coupling techniques for attaching the flange 74 and capture plate 76 can be utilized, such as welding or the like. In another example, the flange 74 and the capture plate 76 are integrally formed with portions of the outer and inner frame cases 62, 64 or adjacent structures. The capture plate 76 and flange 74 can be made of various materials including, but not limited to, a steel alloy, a high-temperature composite or the like. The capture plate 76 and flange 74 can be formed utilizing various techniques, such as casting or machining processes.

A transfer tube 75 may couple the service line 68 and the flange 74 to each other (FIGS. 3A and 3B). In the illustrated example, a portion of the transfer tube 75 is received in a flange bore 88 defined by the flange 74 such that the service line 68 is coupled to the flange 74. An inner path 82 within the transfer tube 75 is configured to communicate fluid F such as cooling airflow or lubricant between an inner passage 83 of the service line 68 and a bearing cavity 39 (FIG. 3A) within the bearing system 38. In alternative examples, the flange bore 88 contacts the service line 68 such that the flange bore 88 fluidly couples the service line

68 to the bearing cavity 39. The fluid F is communicated between the service line 68 and one or more bearings 41 via the bearing cavity 39. The bearings 41 are configured to support a shaft such as the inner shaft 40 (FIG. 1) radially inward of the bearing 41.

In the illustrated example, the service line 68 includes a fitting portion 84 dimensioned to be received within a plate bore 85 defined by the capture plate 76. The fitting portion 84 is configured to permit the distal end 80 of the service line 68 to pivot or otherwise move relative to the capture plate 76. The fitting portion 84 can include various geometries to contact surfaces of the plate bore 85 depending on the needs of a particular situation. In the illustrated example, the fitting portion 84 is a spherical fitting having a generally spherical geometry. The spherical geometry of the fitting portion 84 reduces a bending moment at the distal portion 80 of the service line 68 by distributing the forces along a length of the service line 68. The fitting portion 84 can define at least one groove 86 for receiving a seal 87 configured to reduce leakage through the plate bore 85. In alternative examples, the distal portion 80 of the service line 68 is rigidly attached to the capture plate 76.

The capture plate 76 is arranged relative to the flange 74 such that the distal portion 80 of the service line 68 is pre-skewed in a direction substantially opposite to the deflection caused by the outer frame case 62 relative to the inner frame case 64 during operation of the engine 20. The service line 68 defines a conduit (or first) axis 79 (FIG. 3B) extending between the proximal portion 78 and the distal portion 80. The conduit axis 79 is generally aligned with a flange (or second) axis 89 defined by flange bore 88 of the flange 74 when the proximal portion 78 of the service line 68 is coupled to the flange 74 and the distal portion 80 of the service line 68 is uncoupled from the capture plate 76. The capture plate 76 defines a plate (or third) axis 90 extending through plate bore 85. The flange axis 89 defines a first length $L_1$ from the aftmost portion 58B, and the plate axis 90 defines a second length $L_2$ from the aftmost portion 58B (FIG. 3A).

The flange 74 and capture plate 76 are arranged during cold assembly such that the plate axis 90 is skewed or offset relative to the flange axis 89. The plate axis 90 can be skewed or offset relative to the flange axis 89 by a predetermined amount and/or predetermined distance 91 such as in a direction substantially opposite to the deflection, for example. Accordingly, the conduit axis 79' (FIG. 3A) is generally curvilinear in a radial direction between the proximal portion 78 and the distal portion 80 when the service line 68 is located in an installed position such as during cold assembly.

The predetermined distance 91 includes an axial and/or circumferential component relative to the frame axis B or engine axis A, and can be selected depending on an anticipated thermal deflection of the outer frame case 62 relative to the inner frame case 64. In some examples, the second length $L_2$ of the plate axis 90 relative to the aftmost portion 58B differs from the first length $L_1$ of the flange axis 89 to define the predetermined distance 91. In one example, the second length $L_2$ is less than the first length $L_1$.

The predetermined distance 91 can be selected in part based on a diameter and/or a length of the service line 68 between the outer and inner frame cases 62, 64 and a corresponding stiffness of the service line 68. The service line 68 can include a circular or elliptical cross-sectional geometry also affecting the stiffness of the service line 68.

The flange 74 and capture plate 76 can be arranged such that approximately half of the stresses exerted on the distal portion 80 of the service line 68 occur in one direction, and approximately half of the stresses exerted on the distal portion 80 of the service line 68 occur in the opposition direction, thereby reducing the mean stress on the service line 68 during operation of the engine 20. A reduction in mean stress of the service line 68 results in an improvement in low cycle fatigue of the service line 68.

Pre-skewing the service line 68 utilizing the techniques discussed herein can also reduce separation of the flange 74 relative to a seal interface 97 due to deflection of the outer frame case 62 relative to the inner frame case 64, thereby reducing a likelihood of unseating a seal 98 at the seal interface 97 (FIG. 3A) and reducing seal leakage.

In one example, the distal portion 80 of the service line 68 loaded approximately 0.053 inches in an engine forward direction $D_1$ along the engine axis A during operation of the engine 20. During cold assembly, the distal portion 80 of the service line 68 is pre-skewed by a predetermined distance 91 of approximately 0.027 inches in an opposite engine aft direction $D_2$ along the engine axis A. Thus, a net deflection of the service line 68 is reduced to approximately 0.026 inches or approximately half of the loading in an engine forward direction $D_1$ during a single operating cycle of the engine 20 or aircraft.

The capture plate 76 can have an asymmetrical geometry configured to skew the service line 68 by the predetermined distance 91. In the illustrated example, the plate bore 85 of the capture plate 76 is positioned or offset in an axial and/or circumferential direction by locating one or more apertures 92 defined by the capture plate 76 (FIGS. 3C and 3D). The apertures 92 are configured to receive fasteners to couple the capture plate 76 to the outer frame case 62. The apertures 92 are positioned relative to the plate axis 90 of the capture plate 76 such that the plate axis 90 is offset relative to the flange axis 89 by the predetermined distance 91 and/or in a predetermined direction. In another example, the plate bore 85 of the capture plate 76 is located or offset in the axial and/or circumferential direction relative to a perimeter 93 of the capture plate 76 (FIGS. 3C and 3D).

Incorrect installation of the capture plate 76 would undesirably increase the skewing of the service line 68 in the same direction as the deflection caused by thermal growth of the outer frame case 62. In some examples, the capture plate 76 includes an interference member 96 (FIGS. 3B and 3D) configured to prevent the capture plate 76 from being installed or positioned in an incorrect orientation. The interference member 96 provides a level of mistake proofing to ensure that the capture plate 76 is installed in the correct orientation such that the service line 68 is pre-skewed in a desired direction and in a desired distance.

The interference member 96 is arranged to selectively engage surfaces of the outer frame case 62 or adjacent structure when the capture plate 76 is incorrectly installed. In the illustrated example, the interference member 96 extends from at least one of the collar portion 94 and the main body 95. The collar portion 94 is configured to abut the outer frame case 62 when the interference member 96 is located in a first position or is otherwise correctly installed (FIG. 3D), and is configured to be spaced apart from the outer frame case 62 when the interference member 96 is located in a second position or is otherwise incorrectly installed (e.g., rotated 180 degrees such that the interference member 96 faces inwardly relative to the engine axis A).

One method of assembling the coupling arrangement 60 is as follows. The flange 74 is arranged to abut the inner frame case 64 or adjacent structure such as the bearing support 81. The flange 74 is fixedly attached to the inner frame case 64 or adjacent structure. The proximal portion 78 of the service line 68 is moved in a direction from radially outward to radially inward to abut the flange 74 such that the service line 68 is coupled to the inner frame case 64 at a first axial position $P_1$ (FIG. 3A). The proximal portion 78 of the service line 68 is coupled to the flange 74 utilizing any of the techniques described herein.

The capture plate 76 is moved in a direction from radially outward to radially inward, for example, such that the plate bore 85 of the capture plate 76 receives the distal portion 80 of the service line 68, thereby coupling the service line 68 to the capture plate 76. The capture plate 76 is arranged to abut the outer frame case 62 or adjacent structure. The service line 68 is coupled to the capture plate 76 such that the service line 68 is coupled to outer frame case 62 at a second axial position $P_2$ (FIG. 3A). In one example, the distal portion 80 of the service line 68 is pivotably coupled to the capture plate 76 such that the distal portion 80 is moveable relative to the second axis 89 defined by the flange 74. In some examples, the capture plate 76 is fastened or otherwise coupled to the outer frame case 62 after the flange 74 is fastened or otherwise coupled to the inner frame case 64 to ensure tolerances of the coupling arrangement 60 do not increase or decrease skewing of the service line 68 above or below a predetermined range.

The arrangement of the capture plate 76 in the installed position causes the distal portion 80 of the service line 68 to be pre-loaded in a predetermined direction and in a predetermined distance at cold assembly, including axial and/or circumferential components relative to one of the outer and inner frame cases 62, 64. Accordingly, the distal portion 80 of the service line 68 is pre-loaded in a first direction when in a first position relative to the inner frame case 64, such as cold assembly, and is loaded in a second, different direction when in a second different position relative to the inner frame case 64, such as during operation of the engine 20, to reduce a distance between the first axial position of the service line 68 at the inner frame case 64 and the second axial position of the service line 68 at the outer frame case 62. The first and second axial positions can be determined based upon thermal growth and blow off loads of the outer frame case 62 relative to the inner frame case 64 when in a first operating condition of the engine 20 such as a take-off or cruise condition. In some examples, a magnitude of the load applied to the service line 68 in the first direction is less than or equal to a magnitude of the load in the second direction. In alternative examples, the proximal portion 78 of the service line 68 is pre-skewed relative to the outer frame case 62 or frame axis B utilizing any of the techniques disclosed herein.

Figure 4A:
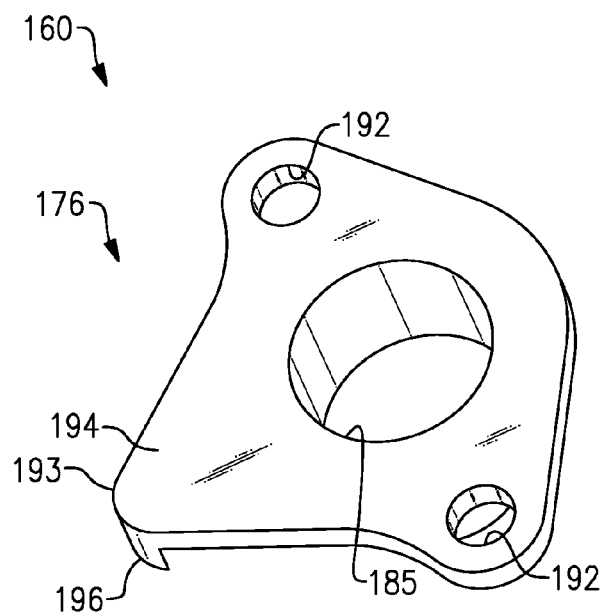
FIG. 4A is a perspective view of a capture plate according to a second embodiment.
Figure 4B:
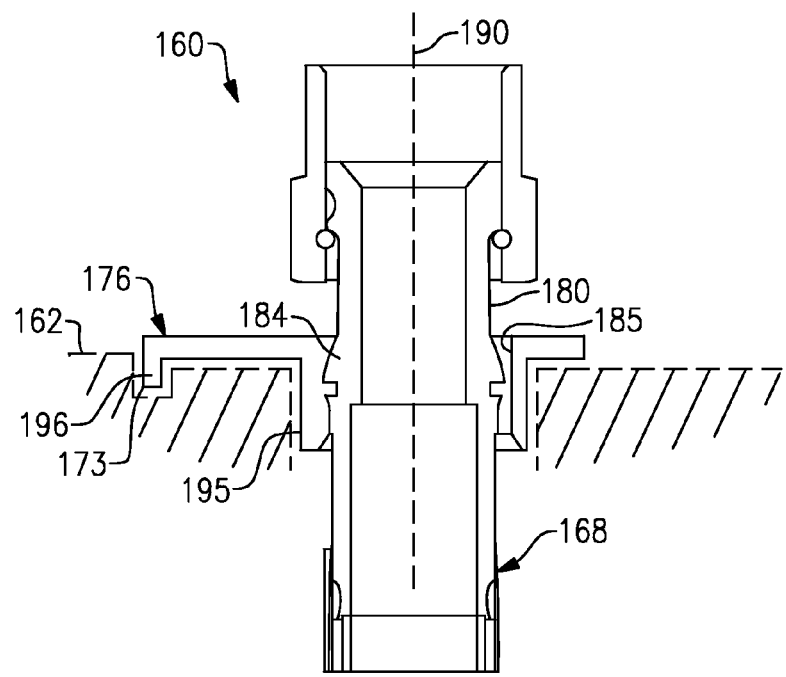
FIG. 4B is a cross-sectional view of the capture plate of FIG. 4A coupled to a service line.

FIGS. 4A and 4B illustrate a coupling arrangement 160 according to a second embodiment. A capture plate 176 includes an interference member 196 extending from a collar portion 194 and spaced apart from a main body 195 (FIG. 4B) of the capture plate 176. In the illustrated example, the interference member 196 is located adjacent to a perimeter 193 of the capture plate 176. As shown in FIG. 4B, the capture plate 176 is located in an installed position relative to the outer frame case 162 and receives a distal portion 180 of the service line 168. The interference member 196 can be configured to be at least partially received within an aperture or keyway 173 of the outer frame case 162 (shown in dashed line in FIG. 4B) when the capture plate 176 is properly installed, but contact another surface of the outer frame member 162 or adjacent structure when the capture plate 176 is improperly installed such that the collar portion 194 is spaced apart from the outer frame case 162.

In alternative embodiments, the interference member 196 is configured to selectively engage surfaces of the outer frame case 162 or adjacent structure when the capture plate 76 is incorrectly installed to space the collar portion 194 from the outer frame case 162.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A coupling arrangement for a gas turbine engine, comprising:
   a conduit between a first frame case defining a frame axis and a second frame case;
   a flange coupled to the conduit defining a first axis and abutting the first frame case; and
   a capture plate coupled to the conduit defining a second axis and abutting the second frame case, the first axis offset relative to the second axis in an axial direction relative to the frame axis such that the conduit is pre-loaded in a first direction.

2. The coupling arrangement as recited in claim 1, wherein the first axis is offset relative to the second axis by a predetermined distance in the axial direction such that the conduit is pre-loaded in the axial direction.

3. The coupling arrangement as recited in claim 2, wherein the first axis is offset relative to the second axis in a circumferential direction relative to the frame axis such that the conduit is pre-loaded in the circumferential direction.

4. The coupling arrangement as recited in claim 2, wherein the flange defines a bore extending along the first axis and coupled to the conduit, the first axis is located at a first axial position, and the second axis is located at a second, different axial position relative to the frame axis.

5. The coupling arrangement as recited in claim 1, wherein the conduit is fixedly attached to the flange and is pivotably coupled to the capture plate.

6. The coupling arrangement as recited in claim 5, wherein the capture plate has a bore extending along the second axis, and the conduit includes a fitting configured to pivotably engage surfaces of the bore.

7. The coupling arrangement as recited in claim 6, wherein the capture plate includes a main body defining the bore, a collar portion extending from the main body and configured to abut the second frame case when in an installed position, and an interference member configured to selectively engage the second frame case such that the collar portion is spaced apart from the second frame case.

8. The coupling arrangement as recited in claim 7, wherein the main body is at least partially received in the second frame case when the interference member is spaced apart from the second frame case.

9. The coupling arrangement as recited in claim 7, wherein the collar portion defines an aperture configured to receive a fastener, and the aperture is positioned relative to the second axis such that the first axis is offset relative to the second axis by a predetermined distance.

10. The coupling arrangement as recited in claim 1, wherein the conduit is configured to communicate fluid with a bearing compartment.

11. A gas turbine engine, comprising:
a mid-turbine frame between a first turbine and a second turbine, the mid-turbine frame comprising:
a plurality of conduits extending between a first frame case and a second frame case;
a plurality of flanges each defining a first axis and connecting one of the plurality of conduits to the first frame case; and
a plurality of capture plates each defining a second axis and connecting one of the plurality of conduits to the second frame case such that each of the second axes is offset relative to a corresponding one of the first axes.

12. The gas turbine engine as recited in claim 11, wherein at least one of the plurality of conduits is configured to communicate fluid with a bearing compartment.

13. The gas turbine engine as recited in claim 11, wherein the first frame case is an inner frame case, and the second frame case is an outer frame case surrounding at least a portion of the first frame case.

14. The gas turbine engine as recited in claim 11, wherein the second frame case is an inner frame case, and the first frame case is an outer frame case surrounding at least a portion of the second frame case.

15. A method of designing a gas turbine engine, comprising:
a) coupling a conduit to a first frame case at a first axial position; and
b) coupling the conduit to a second frame case at a second axial position such that the conduit is loaded in a first direction.

16. The method as recited in claim 15, comprising applying a load to the first frame case in a second, different direction to reduce a distance between the first axial position and the second axial position.

17. The method as recited in claim 16, wherein the load in the first direction is less than or equal to the load in the second direction.

18. The method as recited in claim 15, wherein step b) includes determining the second axial position based upon thermal growth of the first frame case relative to the second frame case when in a first operating condition.

19. The method as recited in claim 15, comprising pivotably coupling the conduit to the second frame case.

20. The method as recited in claim 15, wherein the conduit is configured to communicate fluid with a bearing compartment.

21. The coupling arrangement as recited in claim 6, wherein:
the first frame case and the second frame case define portions of a mid-turbine frame;
the conduit is configured to communicate fluid with a bearing compartment;
the flange is fastened to the first frame case; and
the fitting is a spherical fitting including an outer rim having a generally spherical geometry.

22. The gas turbine engine as recited in claim 12, wherein each of the plurality of conduits is pre-loaded in an axial direction relative to a frame axis defined by the first frame case.

23. The method as recited in claim 17, wherein the conduit is configured to communicate fluid with a bearing compartment, the first frame case and the second frame case define portions of a mid-turbine frame, and the step of coupling the conduit to the second frame case causes the conduit to be loaded both an axial direction and a circumferential direction relative to a frame axis defined by the first frame case.

* * * * *